(12) United States Patent
Crombez et al.

(10) Patent No.: US 8,083,294 B2
(45) Date of Patent: Dec. 27, 2011

(54) BRAKING SYSTEM FOR HYBRID VEHICLE

(75) Inventors: Dale Scott Crombez, Livonia, MI (US); Daniel A. Gabor, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 595 days.

(21) Appl. No.: 12/245,803

(22) Filed: Oct. 6, 2008

(65) Prior Publication Data

US 2010/0084915 A1   Apr. 8, 2010

(51) Int. Cl.
*B60T 8/32* (2006.01)
(52) U.S. Cl. ..................... 303/114.3; 60/550
(58) Field of Classification Search ............ 303/113.4, 303/114.3, 152; 60/547.1, 550; 188/356
See application file for complete search history.

(56) References Cited

U.S. PATENT DOCUMENTS

| | | | |
|---|---|---|---|
| 4,096,696 A * | 6/1978 | Van House | 60/547.1 |
| 4,708,401 A * | 11/1987 | Klein | 303/9.75 |
| 4,787,685 A * | 11/1988 | Klein | 303/114.3 |
| 4,923,256 A * | 5/1990 | Belart et al. | 303/114.1 |
| 5,226,347 A | 7/1993 | Gautier et al. | |
| 5,711,204 A | 1/1998 | Michels | |
| 5,927,825 A | 7/1999 | Schenk et al. | |
| 5,941,608 A | 8/1999 | Campau et al. | |
| 6,234,588 B1 | 5/2001 | Sawada | |
| 6,247,726 B1 | 6/2001 | Kusano et al. | |
| 6,247,762 B1 | 6/2001 | Kusano et al. | |
| 6,267,456 B1 | 7/2001 | Crombez | |
| 6,598,943 B2 | 7/2003 | Harris | |
| 6,837,552 B2 | 1/2005 | Reuter et al. | |
| 6,957,870 B2 * | 10/2005 | Kagawa et al. | 303/113.4 |
| 6,976,741 B2 | 12/2005 | Hara et al. | |
| 2001/0038243 A1 | 11/2001 | Isono | |
| 2004/0061375 A1 * | 4/2004 | Drott et al. | 303/20 |
| 2006/0071544 A1 | 4/2006 | Young | |
| 2006/0163941 A1 | 7/2006 | Von Hayn et al. | |

* cited by examiner

*Primary Examiner* — Christopher Schwartz
(74) *Attorney, Agent, or Firm* — Jerome R. Drouillard; David Kelley

(57) ABSTRACT

A braking system for a vehicle includes an active booster master cylinder connected with the wheel cylinders, and a controller for operating active booster master cylinder during braking. The primary master cylinder, which is located remotely from the active booster master cylinder, is selectably connected with either a pedal feel emulator or a servo system which applies the brakes using the active booster master cylinder and a hydraulic output from the primary master cylinder in the event that control of the active booster master cylinder becomes impaired.

17 Claims, 2 Drawing Sheets

BRAKING SYSTEM FOR HYBRID VEHICLE

BACKGROUND OF THE INVENTION

1. Field of the Invention

The present invention relates to a regenerative braking system for a hybrid vehicle using an active booster master cylinder.

2. Disclosure Information

Hybrid vehicles, such as hybrid electric vehicles, use complex brake systems requiring independent wheel brake control. Some vehicles utilize hydraulic brake-by-wire systems including a high pressure accumulator, a pedal feel emulator, advanced analog valves, a pump, and motor. Typically, current master cylinder units are quite large because of the need to package an active booster as well as a pedal feel emulator together. As used herein, the term "pedal feel emulator" refers to a device which simulates the force/displacement characteristics of a conventional master cylinder and booster assembly, in response to input from a motorist. Emulators are used to produce so-called "transparency" in braking response, whether the vehicle is being braked regeneratively or with a combination of regenerative and friction braking, or solely with the use of friction braking. Also, as used herein, the term "active booster" refers to a device which provides not only an amplification or boosting of force between a mechanical input and a mechanical output, but also an electronically commanded boosted output independent of the mechanical input. Known active boosters utilize stored vacuum as an energy source, but other types of electronic or hydraulic boosters are known to those skilled in the art.

It would be desirable to provide a braking system for a hybrid vehicle in which an active booster master cylinder may be mounted remotely from a primary master cylinder which is actuated by the motorist.

SUMMARY OF THE INVENTION

According to an aspect of the present invention, a braking system for a vehicle includes a number of wheel cylinders and an active booster master cylinder connected with the wheel cylinders. A controller operates the active booster master cylinder during regenerative braking. A primary master cylinder is mounted remotely from the active booster master cylinder. The primary master cylinder is operated by a brake pedal. A servo system, connected between the primary master cylinder and the active booster master cylinder provides a control input from the primary master cylinder to the active booster master cylinder. A pedal feel emulator is connected with the primary master cylinder. The pedal feel emulator may be mounted remotely from the primary master cylinder.

As noted above, a servo system, connected between the primary master cylinder and the active booster master cylinder, provides a control input from the primary master cylinder to the active booster master cylinder. The servo system may include a slave cylinder operatively connected with the primary master cylinder through a cutoff valve operated by the system controller, with the cutoff valve causing the hydraulic output of the primary master cylinder to be selectively connected with one of either the brake pedal feel emulator, or the slave cylinder. The slave cylinder further includes a piston responsive to the displacement of brake fluid from the primary master cylinder. The piston is mounted upon a sliding member abuttingly engaged with a brake application push rod contained within the active booster master cylinder, such that the sliding member and the brake application push rod are not coupled. In other words, the active booster master cylinder is free to stroke, in response to its own inputs, without corresponding movement of the servo piston and the sliding member to which the servo piston is mounted.

When the servo piston is actuated by means of the primary master cylinder, the appropriate fluid output will be generated from the active booster master cylinder. This is important, because in the event that the operation or control of the active booster master cylinder becomes impaired, the vehicle operator will be able to maintain braking capability by depressing the brake pedal, which will in turn cause the fluid to be expelled from the primary master cylinder, with the fluid then entering the servo and causing the servo piston and the sliding member to which the servo piston is mounted to push on the brake application push rod contained within the active booster master cylinder. This will cause the hydraulic brakes of the vehicle to be applied.

According to another aspect of the present invention, a system controller utilizes output from a brake pedal travel sensor to activate the active booster master cylinder without using the servo system during normal operation of the braking system. Conversely, the controller activates the servo system, so as to allow operation of the active booster master cylinder by means of the primary master cylinder in the event that control of the active booster master cylinder becomes impaired.

According to another aspect of the present invention, a vehicle stability control device, such as an anti-lock braking system, or vehicle directional stability controller, may be positioned between the active booster master cylinder and the wheel cylinders. The anti-lock brake device or other vehicle stability control device may be operated by the system controller.

According to another aspect of the present invention, a servo system is connected between the primary master cylinder and the active booster master cylinder, with the servo system comprising a slave cylinder responsive to the hydraulic output of the primary master cylinder, which is routed through a cutoff valve operated by the controller. The cutoff valve causes the hydraulic output of the primary master cylinder to be selectively connected with one of the pedal feel emulator and the slave cylinder. The slave cylinder has a piston operatively connected with the active booster master cylinder. The controller and the previously mentioned brake pedal travel sensor operate the active booster independently from the primary master cylinder during normal braking system operation. However, the controller causes the cutoff valve to connect the primary master cylinder with the slave cylinder, so as to allow operation of the active booster master cylinder by means of the primary master cylinder in the event that control of the active booster master cylinder becomes impaired.

It is an advantage of a system according to the present invention that an active booster master cylinder may be mounted remotely from a primary master cylinder and a pedal emulator device. This allows significant advantages in terms of packaging the required componentry for the hybrid braking system in the space-limited confines of a modern motor vehicle.

It is another advantage of a system according to the present invention that conventional brake pedal feel will be maintained, while allowing fully automatic control and application of a braking system when regenerative braking is available.

It is another advantage of the present system that certain conventional, existing, brake components such as master cylinders, brake pedals, and ABS/stability control units may be utilized, thereby facilitating the fitment of hybrid braking in vehicles having conventional instrument panel and underhood structures.

It is yet another advantage of the present system that superior braking performance may be realized under various operating modes, including normal braking and braking with a functionally compromised brake system.

It is yet another advantage of the present system that this system may be used with many types of vehicles, including pure electrics and non-hybrid vehicles powered by internal combustion engines, in which the space available for braking system componentry dictates that the primary master cylinder and booster be separated.

Other advantages, as well as features of the present invention will become apparent to the reader of this specification.

DETAILED DESCRIPTION OF THE PREFERRED EMBODIMENTS

Figure 1:
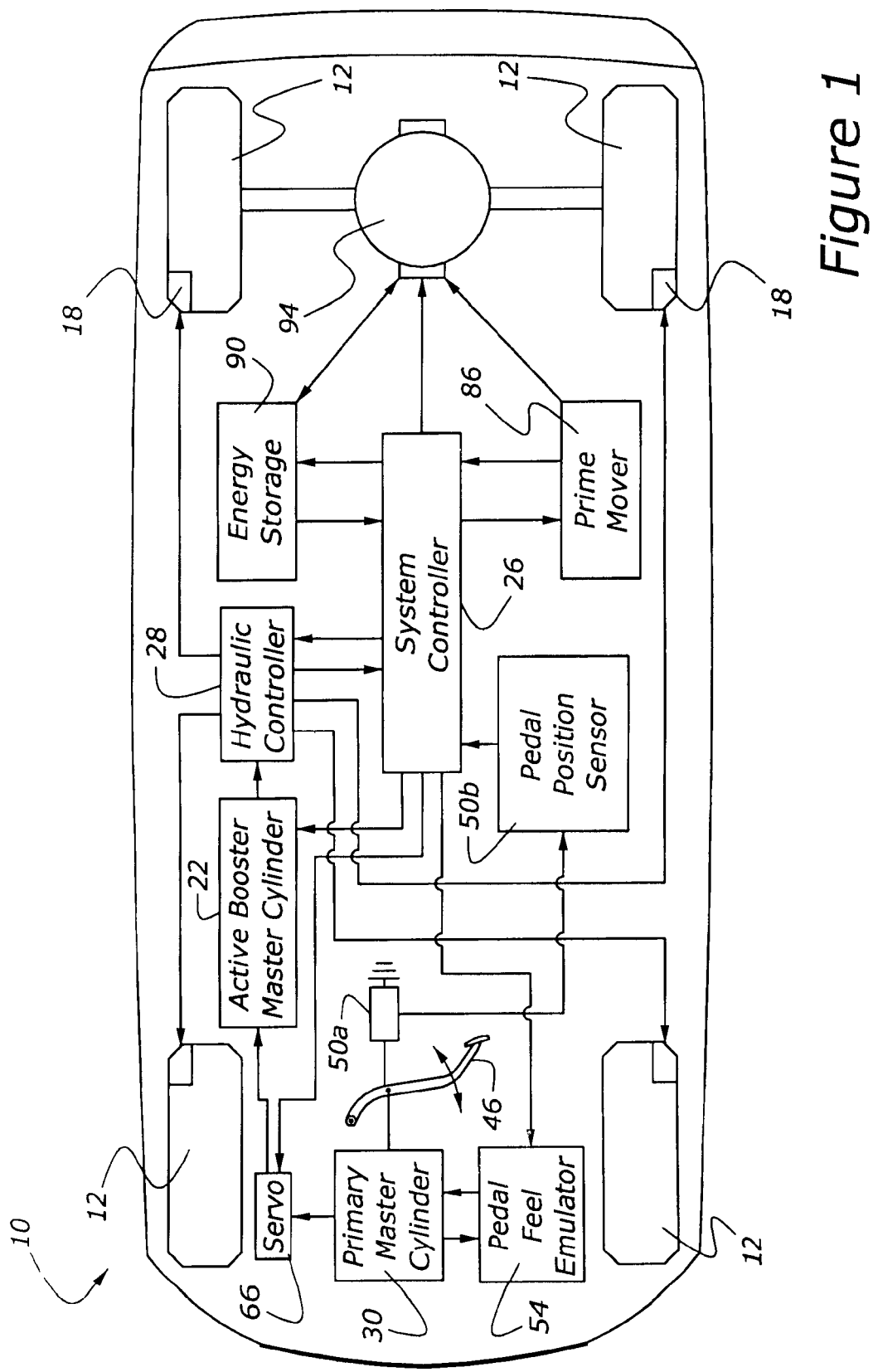
FIG. 1 is a schematic representation of a hybrid vehicle having a braking system according to the present invention.

As shown in FIG. 1, vehicle 10 is equipped with road wheels 12, with each road wheel having a brake system including a wheel cylinder, 18. All wheel cylinders 18 are connected with an active booster master cylinder, 22. Active booster master cylinder 22 is operated primarily by controller 26 which receives inputs from a number of sensors including a brake pedal input sensor 50a and 50b, which is connected with brake pedal 46 and which furnishes a signal indicative of the motorist's intention to apply the brakes of vehicle 10. Controller 26 further operates a hydraulic controller, 28, which may be configured to provide antilock braking and stability control functions.

Figure 2:
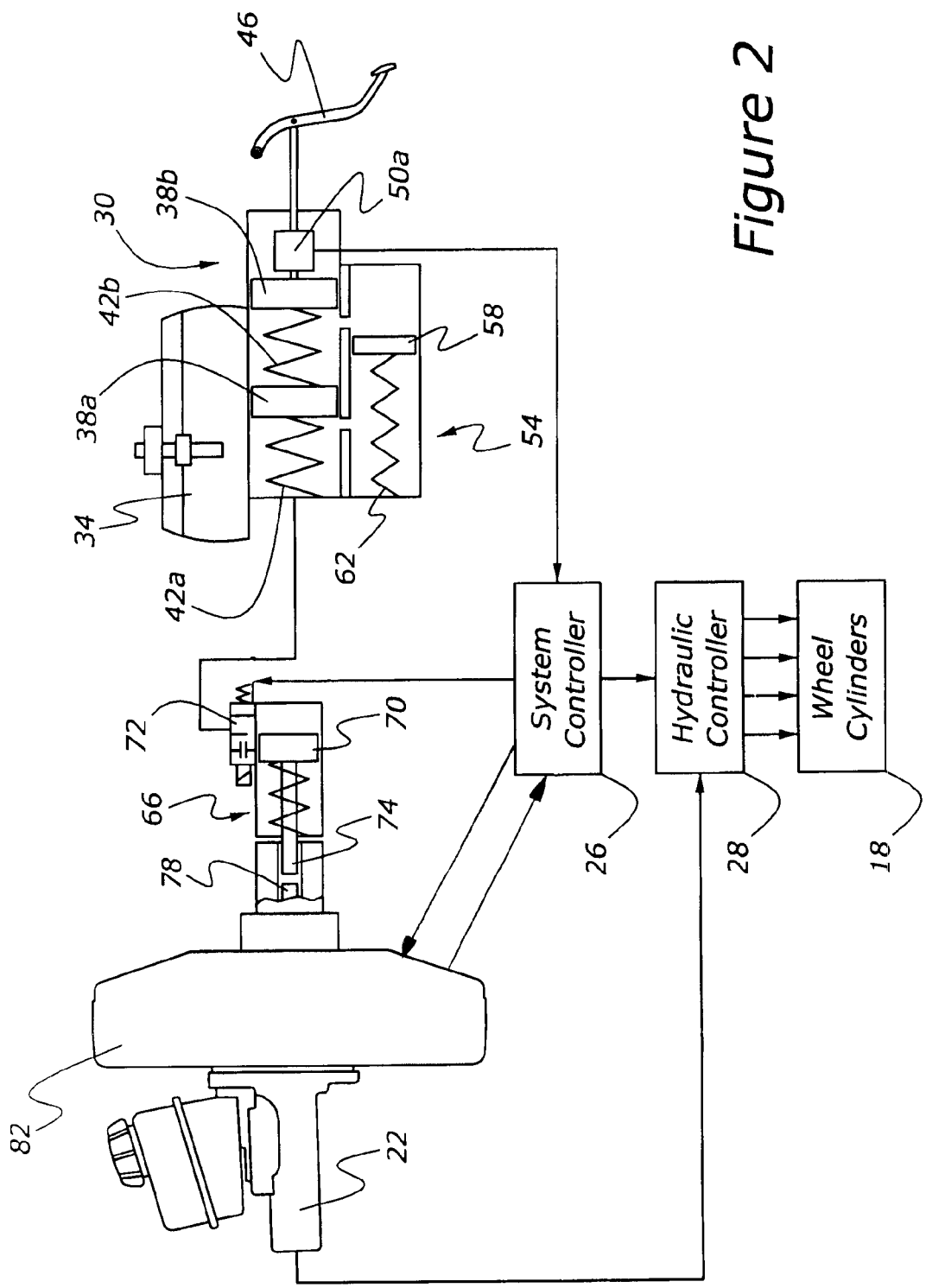
FIG. 2 is a schematic representation of a portion of the braking system found in FIG. 1.

The present braking system also includes a primary master cylinder, 30, which is connected with brake pedal 46. Primary master cylinder 30 has two pistons, 38a and 38b, which are mounted within master cylinder 30 beneath reservoir 34, as shown in FIG. 2. Pistons, 38a and 38b define two working chambers. The positions of pistons 38a and 38b are controlled in part by resilient elements or springs 42a and 42b. Primary master cylinder 30 is mounted remotely from active booster master cylinder 22. Because primary master cylinder 30 is unboosted, it occupies a much smaller space than conventional power brake master cylinders, and this permits master cylinder 30 to be mounted in vehicles having little space within the engine/motor compartment and little available space on the dash panel. Alternatively, the present system may be implemented with a single master cylinder piston, saving both cost and package space.

According to another aspect of the present invention, pedal feel emulator 54 is connected with primary master cylinder 30. Note that pedal feel emulator 54 may be mounted either adjacent primary master cylinder 30, as disclosed in U.S. Pat. No. 6,267,456, which is hereby incorporated by reference in this specification, or remotely from primary master cylinder 30, as disclosed in U.S. Pat. No. 6,976,741, which is also incorporated by reference. Pedal feel emulator 54 may be actively isolated from primary master cylinder 30 through the use of a valve (not shown) controlled by controller 26, or may be passively isolated using design features within primary master cylinder 30 and emulator 54, in the manner described in U.S. Pat. No. 6,267,456. Pedal feel emulator 54 includes at least one piston, 58, and a resilient element 62, which acts with piston 58 to simulate the force/displacement curve of a conventional master cylinder connected with a number of conventional wheel cylinders. In a preferred embodiment, multiple resilient elements are used.

One of the tasks of controller 26 is to selectively connect the hydraulic output of primary master cylinder 30 with pedal feel emulator 54, when vehicle 10 is being braked regeneratively. In this manner, the vehicle's human operator will experience a consistent response of vehicle 10 to depression of brake pedal 46, notwithstanding that vehicle 10 is operating wholly under regenerative braking, or partially under regenerative braking and hydraulic braking, or solely under hydraulic braking.

When vehicle 10 is operating with regenerative braking, motor/generator 94 converts kinetic energy to electrical energy which is stored in energy storage device 90. Motor generator 94 may comprise either an electrical motor generator, or a hydraulic motor/pump, or pneumatic motor/pump, with energy storage device 90 comprising either an electric storage battery, a fluid accumulator device, flywheel accumulator, or other suitable energy storage device. Prime mover 86 may be constituted as an internal combustion engine or a fuel cell system or other device for using stored energy other than from energy storage device 90 to propel vehicle 10.

In the event that control of active booster master cylinder 22 becomes impaired, controller 26 will cause cutoff valve 72 to route hydraulic output from primary master cylinder 30 to servo system 66. Servo system 66 is connected between primary master cylinder 30 and active booster master cylinder 22, and the servo system allows primary master cylinder 30 to provide a control input to active booster master cylinder 22. Servo system 66 includes a servo piston, 70, which is acted upon by hydraulic pressure from primary master cylinder 30 pushing through cutoff valve 72, which is controlled or operated by controller 26. Cutoff valve 72 allows controller 26 to route the hydraulic output of primary master cylinder 30 to servo system 66.

Servo piston 70 is mounted upon sliding member 74, which abuts brake application push rod 78 contained within active booster master cylinder 22. Note that sliding member 74 and brake application push rod 78 are not coupled to one another. Controller 26 may apply vehicle brakes using booster portion 82 of active booster master cylinder 22 without servo piston 70 moving. However, when cutoff valve 72 is in the correct position, hydraulic output from primary master cylinder 30 causes servo piston 70 and sliding member 74 to push upon brake application push rod 78, causing hydraulic fluid to be expelled from active booster master cylinder 22 and sent to hydraulic controller 28, and ultimately to wheel cylinders 18. According to another aspect of the present invention, hydraulic controller 28 may be configured as a vehicle stability control device or an anti-lock brake device, or both.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A braking system for a vehicle, comprising:
a plurality of wheel cylinders;
an active booster master cylinder connected with said wheel cylinders;
a controller for operating said active booster master cylinder;

a primary master cylinder mounted remotely from said active booster master cylinder, with said primary master cylinder being operated by a brake pedal;

a servo system, connected between said primary master cylinder and said active booster master cylinder, for providing a control input from said primary master cylinder to said active booster master cylinder; and a brake pedal travel sensor operatively connected with the brake pedal and with said controller, wherein said controller utilizes output from said brake pedal travel sensor to operate said active booster master cylinder without using said servo system during normal operation of said braking system, with said controller activating said servo system, so as to allow operation of said active booster master cylinder by means of said primary master cylinder in the event that control of said active booster master cylinder becomes impaired.

2. A braking system according to claim 1, further comprising a pedal feel emulator connected with said primary master cylinder.

3. A braking system according to claim 2, wherein said pedal feel emulator is mounted remotely from said primary master cylinder.

4. A braking system according to claim 2, wherein said servo system comprises a slave cylinder operatively connected with said primary master cylinder through at least one cutoff valve for causing the hydraulic output of said primary master cylinder to be selectively connected with one of said pedal feel emulator and said slave cylinder.

5. A braking system according to claim 4, wherein said slave cylinder further comprises at least one piston responsive to the displacement of brake fluid from said primary master cylinder, and with said at least one piston being mounted upon a sliding member abuttingly engaged with a brake application pushrod contained within said active booster master cylinder, such that said sliding member and said brake application pushrod are not coupled.

6. A braking system according to claim 4, wherein said cutoff valve is operated by said controller.

7. A braking system according to claim 2, wherein said servo system comprises a slave cylinder operatively connected with said primary master cylinder through a cutoff valve operated by said controller, with said cutoff valve and said controller causing the hydraulic output of said primary master cylinder to be selectively connected with one of said pedal feel emulator and said slave cylinder, and with said pedal feel emulator being located proximate said slave cylinder.

8. A braking system according to claim 1, wherein said active booster master cylinder is mounted remotely from said primary master cylinder.

9. A braking system according to claim 1, further comprising a regenerative brake subsystem operated by said controller.

10. A braking system according to claim 1, further comprising an antilock brake device positioned between said active booster master cylinder and said wheel cylinders, with said antilock brake device being operated by said controller.

11. A braking system for a vehicle, comprising:
a plurality of wheel cylinders;
an active booster master cylinder connected with said wheel cylinders;
a controller for operating said active booster master cylinder during regenerative braking;
an unboosted primary master cylinder mounted remotely from said active booster master cylinder, with said primary master cylinder being operated by a brake pedal;
a pedal feel emulator operatively connected with said primary master cylinder, with said pedal feel emulator being mounted remotely from said primary master cylinder; and
a servo system connected between said primary master cylinder and said active booster master cylinder, with said servo system comprising a slave cylinder responsive to the hydraulic output of said primary master cylinder, which is routed through a cutoff valve operated by said controller, with said cutoff valve causing the hydraulic output of said primary master cylinder to be selectively connected with one of said pedal feel emulator and said slave cylinder, and with said slave cylinder having a piston operatively connected with said active booster master cylinder.

12. A braking system according to claim 11, further comprising a regenerative brake subsystem operated by said controller.

13. A braking system according to claim 11, wherein said slave cylinder comprises a piston mounted upon a sliding member housed within a cylinder connected with said primary master cylinder through said cutoff valve, with said sliding member abutting a brake application pushrod contained within said active booster master cylinder.

14. A braking system for a vehicle, comprising:
a plurality of wheel cylinders;
an active booster master cylinder connected with said wheel cylinders;
a controller for operating said active booster master cylinder during regenerative braking, with said controller receiving a control input from at least a brake pedal travel sensor;
a vehicle stability control device positioned between said active booster master cylinder and said wheel cylinders, with said vehicle stability control device being operated by said controller;
an unboosted primary master cylinder mounted remotely from said active booster master cylinder, with said primary master cylinder being operated by a brake pedal having a travel sensor;
a pedal feel emulator operatively connected with said primary master cylinder, with said pedal feel emulator being mounted remotely from said primary master cylinder; and
a servo system connected between said primary master cylinder and said active booster master cylinder, with said servo system comprising a slave cylinder responsive to the hydraulic output of said primary master cylinder, which is routed through a cutoff valve operated by said controller, with said cutoff valve causing the hydraulic output of said primary master cylinder to be selectively connected with one of said pedal feel emulator and said slave cylinder, and with said slave cylinder having a piston operatively connected with said active booster master cylinder, with said controller and said brake pedal travel sensor operating said active booster independently from said primary master cylinder during normal braking system operation, but with said controller causing said cutoff valve to connect said primary master cylinder with said slave cylinder, so as to allow operation of said active booster master cylinder by means of said primary master cylinder, in the event that control of said active booster master cylinder becomes impaired.

15. A braking system according to claim 14, further comprising a regenerative brake subsystem operated by said controller.

16. A braking system according to claim 14, wherein said vehicle stability control device comprises an antilock brake device.

17. A braking system according to claim 14, wherein said vehicle stability control device comprises a vehicle stability controller.

* * * * *